United States Patent [19]

Potjes et al.

[11] Patent Number: 4,467,615
[45] Date of Patent: Aug. 28, 1984

[54] CONTROL SYSTEM FOR DIESEL POWERED REFRIGERATION PLANT

[75] Inventors: Robert A. Potjes, Costa Mesa; Rudolph C. Degroot, Sr., Laguna Niguel, both of Calif.

[73] Assignee: Sencon Engineering Inc., Laguna Niguel, Calif.

[21] Appl. No.: 339,287

[22] Filed: Jan. 15, 1982

[51] Int. Cl.³ .................... G05D 23/32; F25B 27/00; F02N 17/00
[52] U.S. Cl. ........................................ 62/158; 62/208; 62/229; 62/323.1; 123/179 BG
[58] Field of Search .................. 123/179 B, 179 BG; 62/323.1, 158, 231, 229, 208, 209, 213, 214; 236/78 B; 290/37 R, 38 R, 38 C

[56] References Cited

U.S. PATENT DOCUMENTS 3,926,167 12/1975 Camp ............................. 62/323.1 X

FOREIGN PATENT DOCUMENTS 128136 11/1978 Japan ..................................... 62/158
156266 5/1980 Japan ........................... 123/179 BG Primary Examiner—Harry B. Tanner
Attorney, Agent, or Firm—Willie Krawitz

[57] ABSTRACT

A control system is disclosed for turning a diesel engine on and off to power a refrigeration plant, based on temperature requirements. The desired temperature limits are preset, and when these limits are exceeded, a first timer is set for a desired delay, during which the engine is off; delay times of up to one hour are usual. At the end of this delay time, the first timer will activate glow plugs in the engine. Simultaneously with turning on the glow plugs, a second timer actuates the engine starter after a short delay to start the engine. During the delay period set by the first timer, the diesel engine will be off, and hence, the control system saves diesel fuel and reduces engine maintenance. An electronic circuit for operating the timing system is also disclosed.

13 Claims, 3 Drawing Figures

CONTROL SYSTEM FOR DIESEL POWERED REFRIGERATION PLANT

BACKGROUND OF THE INVENTION

This invention relates to a new and improved system for controlling a diesel powered refrigeration plant, and has particular utility in the food industry.

Present day diesel powered refrigeration plants employed in food storage facilities include trucks, railroad refrigeration cars, and stationary plants. Various factors determine the temperature range settings of these refrigeration plants, such as the thermal capacity of the plant (including the insulation portion) ambient temperature, heat exchange leaks, particularly from open doors, thermal capacity of the food, the required storage temperature of the food itself, and projected weather conditions. The diesel engine is operated continuously to maintain the temperature within the desired range even if this necessitates that heat be supplied to the plant to compensate for over cooling. This, of course, represents a considerable waste of cooling power. If the diesel engine is turned on and off frequently to reduce power costs, the repeated start ups eventually exact a high toll due to engine mantenance.

If it were possible to supply cooling power alone to the refrigerator plant, without requiring heat input, the cooling power could be utilized more efficiently. Also, if the stored cold of the food could be used as a 'cold sink'(or heat sink if warming was required), it would be possible to use the diesel engine only intermittently rather than continuously.

THE INVENTION

According to the invention, there is provided a control system for a diesel powered refrigeration plant that eliminates the need for heat warming as a consequence of overcooling, and utilizes the stored cold to maintain the temperature of the refrigeration plant within acceptable levels while the diesel engine is off. Restarting the diesel engine is effected without difficulty using glow plugs to preheat the engine cylinders, and this also results in less wear on the engine.

Basically, the control system uses the thermal content of the refrigeration plant and the food itself to maintain the required cold condition within the preset temperature range. During this period of time, the diesel engine will be off, and hence the cooling power will be off. If the refrigeration plant temperature increases (or decreases) outside the preset range, a maximum of say up to one hour is permitted before a timer actuated control turns on a set of glow plugs to heat the diesel engine cylinders. Shortly thereafter, the engine itself is turned on. Since the diesel engine will be off during this period, a considerable power savings will be effected. The start up sequence will turn on glow plugs that guarantee engine start up, and also enables a reduction in maintenance costs. Obviously, if the ambient temperature is the same or close to the preset refrigeration temperature, there will be little or no heat exchange losses, and diesel cooling power requirements will be reduced considerably.

An electronic circuit is provided for the timer function, and to bypass the timer operation when ambient air is admitted to the refrigeration plant, for example when a door to the refrigerator is opened.

BRIEF DESCRIPTION OF THE DRAWINGS

FIG. 2 is a circuit diagram for controlling the diesel engine turn on; and,

FIG. 3 is a circuit diagram of a power supply for the circuit of FIG. 2.

DESCRIPTION OF THE PREFERRED EMBODIMENTS

Figure 1:
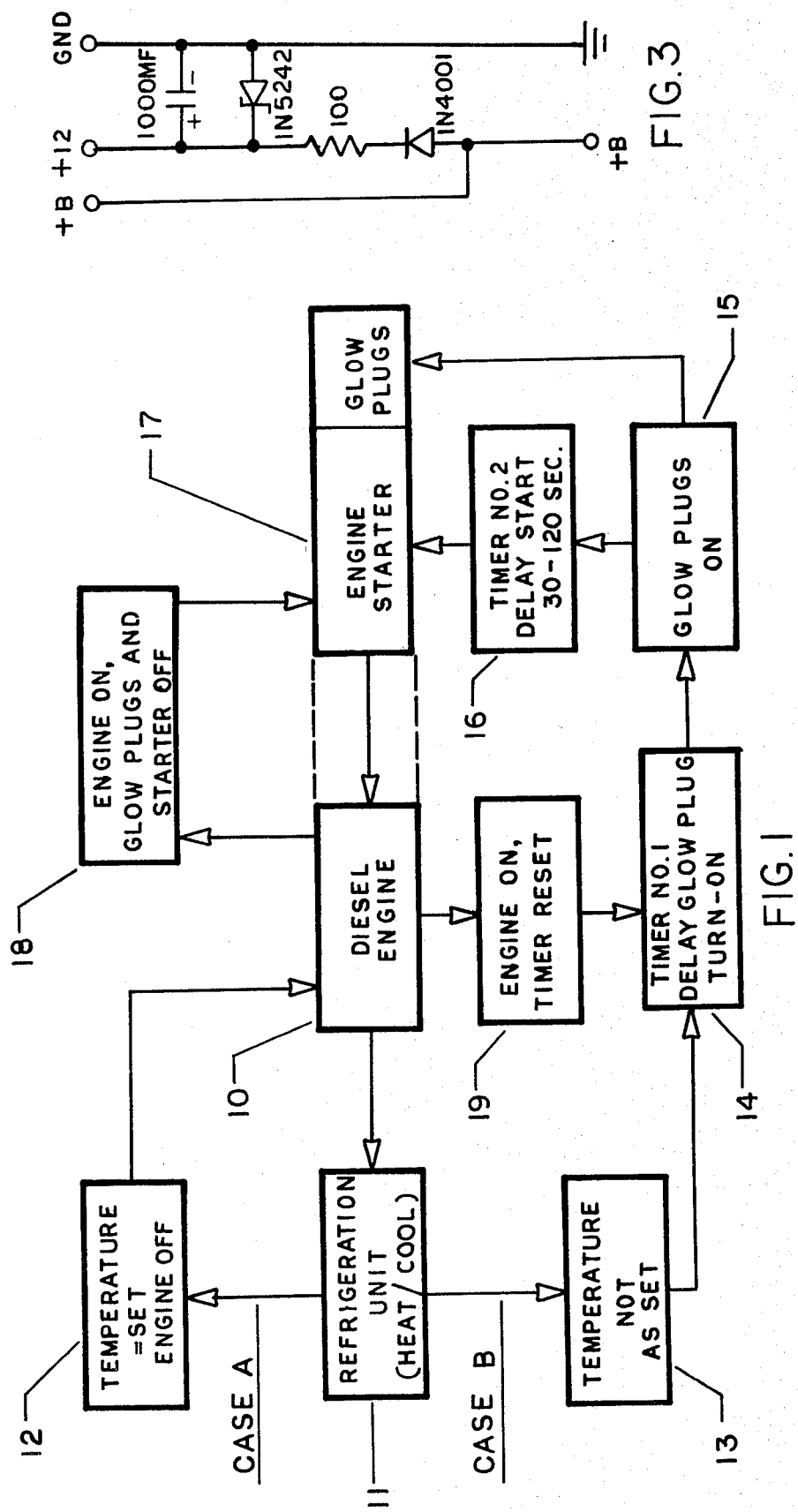
FIG. 1 is a system block diagram for the operation of the diesel powered refrigeration plant of this invention.

The diesel powered control system of this invention is shown in FIG. 1, and includes a diesel engine 10 that supplies power to heat or cool a refrigerator plant 11.

In case "A", if the refrigeration temperature falls within the set temperature range 12, temperature power is not required, and the diesel engine will be off.

In Case "B", when the refrigeration temperature falls outside the set temperature range 13, the diesel engine is not started up immediately to effect cooling (or heating). Instead, the cooling capacity of the refrigerator and food or other commodity are employed for cooling the system for a specific period of time. This will depend on a variety of factors such as ambient temperature, weather predictions, the thermal capacity of the refrigerator, heat exchange leaks, thermal capacity and cooling requirements of the commodity, etc.

When the refrigeration temperature range falls outside the set temperature range 13, a first timer delay 14 is set to activate one or more engine starter glow plugs. A typical timer delay period is about 2-90 minutes, and usually a delay period is chosen by the commodity being shipped or stored. As indicated, the diesel engine power will be off during the time delay period. At the end of the delay period, the glow plugs will be turned on 15, and a second timer 16 is set to actuate the engine starter. Usually, setting of the second timer 16 and turning on the glow plugs 15 are carried out simultaneously. Following setting of the second timer, about a 30–120 second delay takes place so that the glow plugs can warm up the engine cylinders. The diesel is then started 17, and the glow plugs and engine starter are turned off 18. If desired, when the engine is turned on, the first timer 14 can be reset 19, or alternatively the timer can be automatically reset following the glow plug turn on.

Figure 2:
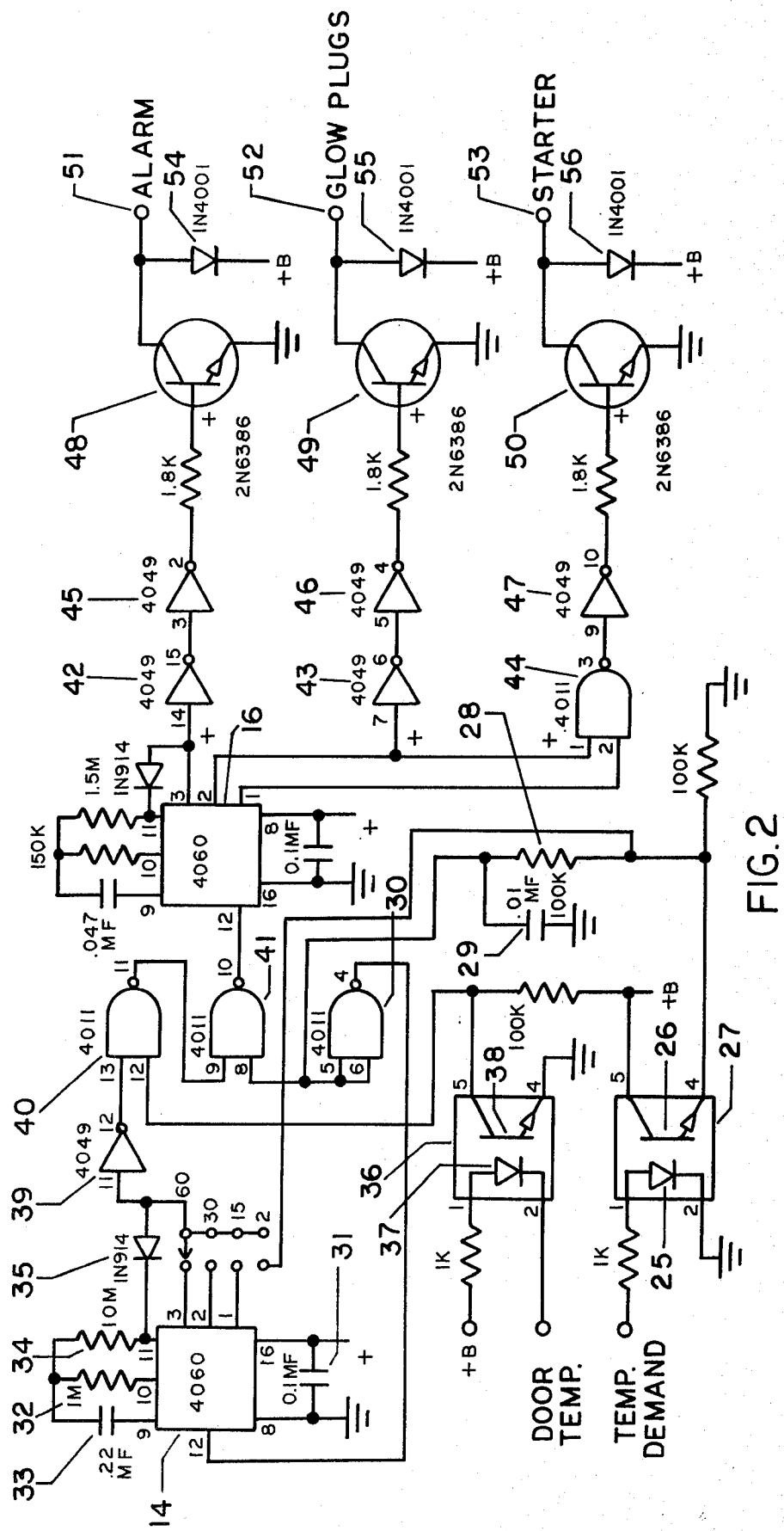

A circuit for performing the timing function is shown in FIG. 2. A temperature demand input signal from the set temperature range 13 is applied through a 1K resistor to a diode emitter 25 that is optically coupled to a phototransistor 26; the emitter diode and transistor function as a switch 27. If the refrigeration temperature is within the set temperature range 12 (Case A) the temperature demand signal will be low, and switch 27 will be off. However, if the refrigeration temperature is outside the set temperature range 13 (Case B), the signal strength increases and the switch is activated. A signal is passed from the switch through a resistance 28 and capacitance 29 network. This network functions as a filter and also to produce an initial 'clear' pulse that sets various components to a low level or ground state. Following filtering, the signal passes through an inverter gate 30 and into the first timer delay 14. The timer delay is grounded on one side through a capacitance 31, which performs a filter function to remove noise spikes. A resistance 32 and capacitance 33 form a timing RC for the timer chip 14, and a resistance 34 may be used as part of the chip circuit. Four timing levels are shown ranging from 2-60 minutes, and these levels will generally be sufficient to accommodate for most refrigeration requirements. Timer chip (4060) 14 and 16 is manufactured by National Semiconductor, and this chip is described in their data book "CMOS INTEGRATED CIRCUITS", 1978 on pages 2-57 to 2-61. Pins 1-3 are timing circuit pins that are set for specific times using RC circuit elements 32, 33, 34 for timer 14 and corresponding RC circuit elements for timer 16; additional functions of these pins will be described, infra. A diode 35 is used to reduce feedback from the front end of the circuit.

Usually, a temperature reading for the demand signal is located in the refrigeration unit at a point remote from the door opening. However, if the refrigerator door is opened, the entire temperature balance becomes upset, and hence a delay override capability is preferred. For this purpose, a second demand signal is provided, and is based on a temperature reading near the door opening, the demand signal being fed to a switch 36. A diode emitter 37 optically coupled to a phototransistor 38, comprise the switch 36.

Pulses from the first time delay 14 are fed to an inverter 39, and signals from both the time delay 14 and switch 36 are fed to a NOR gate 40. The gate 40 will pass a signal from either the time delay 14 or the switch 36. An inverter gate 41 receives the signal from gates 40 and 30 and the gate 41 will pass the signal to the second timer 16; this eventually will activate the glow plugs. The RC timing, diode feedback and spike supression means for the second timer 16 is the same as in the first timer 14.

When the temperature demand signal goes on, NAND gate 30 goes negative and unlocks oscillator timer 14. When the timer 14 ends its delay, its output goes positive, the output of inverter 39 goes negative, and gate 40 goes positive. Since pin 8 of gate 41 is positive, when gate 9 now becomes positive, gate 41 turns on and unlocks timer 16 (4060).

When the door temperature increases, LED 37 conducts, and the output of switch 37 goes negative. This turns on NOR gate 40 because pin 13 is positive (timer 14 has not yet timed out) and pin 12 is negative. The output of gate 40 then becomes positive. If demand is present, a positive signal will be present on pin 8 of gate 41, and because pin 9 is already positive, NAND gate 41 will turn on and start the timer 16.

As shown, the output polarity of timer 16 is positive, and since the signal is subsequently driven and inverted, preinverters 42, 43 and an inverter gate 44 are required to obtain the correct ultimate polarity. The inverted signals are applied to driver inverters 45, 46 and 47. The signal is applied to transistors 48, 49 and 50 with the necessary positive input polarity being indicated.

Transistor 48 is connected to an alarm 51 which is off when the transistor 48 input is negative. Transistors 49 and 50 amplify the signals to heat the glow plugs 52 and activate the starters. When transistors 48, 49 and 50 are driven to saturation by the timer, they will turn on. Timer 16 is designated so that the output pins 1, 2 and 3 produce three different timing cycles. Pin 2 turns on the glow plugs, pins 1 and 2 turn on the starter, and pin 3 enables the alarm. When the timer 16 times out, output 2 will become positive and pin 1 goes positive after a brief period.

If the engine fires, external relays, not shown, will disconnect the starter and glow plugs. If the engine fails to fire, and timer 16 times out, pin 3 which is now positive will cause diode 1N914 to lock out timer 16; pin 14 will remain positive until the timer is reset. This will also turn on transistor 48 and enable the alarm. An external sensing circuit, not shown, senses the engine is not on and then turns on the alarm. When the temperature demand on switch 27 ceases, the output from the switch goes negative to pin 8 of NAND gate 41. The output of gate 41 goes positive, and the reset line of timer 16 is actuated. The output from pin 3 goes negative and disables the alarm used to protect the transistors from excessive current surges, but their use is optional. FIG. 3 shows the power supply for the circuit.

The refrigeration control system of this invention permits considerable power savings and enables an operator to make better use of ambient temperature conditions, and thermal capacities of the food and refrigeration plant. Consequently, ambient night time temperatures that are almost invariably cooler, permit a storage operator to reduce or even cease cooling the refrigeration plant during the night rather than simply continuously running the diesel engine, without regard to actual cooling requirements. Furthermore, use of a demand override signal enables an operator to accommodate for a sudden temperature increase in the refrigerator door area when the door is opened, even though the temperature change would not be detected immediately at a remote end of the unit.

We claim:

1. A control system for a diesel powered refrigeration plant, comprising:
   a. a diesel engine;
   b. starter means for the engine, including glow plug heaters for the engine;
   c. a refrigeration plant, including heating and cooling means powered by the diesel engine;
   d. means for controlling the turn on of diesel engine power to the heating and cooling means, including:
      i. first and second temperature sensing means, one of said means being adapted to sense temperature fluctuations near an open door of the refrigerator;
      ii. temperature setting means to set the temperature level of the refrigeration plant;
      iii. a first timer delay, the temperature sensing means near the open door of the refrigerator being adapted to override the first time delay; and,
      iv. a second timer actuated by the first timer, and adapted to activate the glow plugs and starter means; whereby,
   A. when the refrigerator temperature equals the set temperature level, the diesel engine is off;
   B.
      i. when the refrigerator temperature is outside the set temperature level, the first timer delay turns on the second timer; and,
      ii. the second timer delay activates the glow plugs and engine starter to start the diesel engine; and,
   C. when the diesel engine is started, the glow plug heaters and starter is turned off.

2. A method for controlling temperature in a refrigerator plant, including heating and cooling means, powered by a diesel engine to reduce heating and cooling power and to reduce maintenance costs, comprising:
   a. setting the temperature level of the refrigerator plant;
   b. sensing the temperature of the refrigerator plant by means of a first and second temperature sensing means, one of said means being adapted to sense temperature fluctuations near an open door of the refrigerator;

c. turning on glow plug heaters for the diesel engine with a first timer after a first delay period, the temperature sensing means near the open door of the refrigerator being adapted to override the first timer;

d. activating an engine starter for the diesel engine with a second timer after a second delay period; and, e. turning off the glow plug heaters and starter when the diesel engine is started; whereby, A. when the refrigerator temperature equals the set temperature level, the diesel engine is off;

B.
  i. when the refrigerator temperature is outside the set temperature level, the first timer delay turns on the second timer; and,
  ii. the second timer delay activates the glow plugs and engine starter to start the diesel engine.

3. A circuit for controlling temperature in a refrigeration plant having heating and cooling means powered by a diesel engine, including an engine starter and engine glow plugs, comprising:

a. temperature demand signal input means from the refrigeration plant;

b. a first timer means for producing a time delay upon receipt of an input signal from the temperature demand signal input means;

c. switch means connecting the first timer with the temperature demand input signal means and for actuating the first timer when the demand signal exceeds preset temperature limits;

d. a second timer means actuated by the first timer means;

e. amplifier means connected to the second timer, the amplifier being adapted to enable an alarm, turn on the glow plugs and activate the the engine starter upon actuation by the second timer, thereby turning on the diesel engine to power the heating or cooling means after the glow plugs have been turned on;

f. means to turn off the starter and glow plugs after the engine is started; and, g. means to turn off the diesel engine when the refrigerator temperature equals the set temperature.

4. The control system of claim 1, in which the glow plugs are turned on within about one hour after the first timer is activated.

5. The control system of claim 4, in which the starter means is activated within about 30–120 seconds after the second timer is turned on.

6. The control system of claim 5, in which the glow plugs and the second timer are turned on simultaneously.

7. The control system of claim 1, in which the first timer is reset when the engine is turned on.

8. The method of claim 2, in which the glow plugs are turned on within about one hour after the first timer is activated.

9. The method of claim 2, in which the starter means is activated within about 30–120 seconds after the second timer is turned on.

10. The method of claim 2, comprising simultaneously turning on the glow plugs and the second timer.

11. The method of claim 2, comprising resetting the first timer when the engine is turned on.

12. The circuit of claim 3, including first and second temperature sensing means, one of said means being adapted to sense temperature fluctuations near an open door of the refrigerator, and to override the time delay means.

13. The circuit of claim 3, in which the glow plugs are turned on within about one hour after the first timer is activated and the starter means is activated within about 30–120 seconds after the second timer is turned on.

* * * * *